July 28, 1936.   A. VON WANGENHEIM   2,048,982

PUMPING MEANS

Original Filed Feb. 18, 1931

INVENTOR
Adolf von Wangenheim
BY Andrew K. Foulds
His ATTORNEY

Patented July 28, 1936

2,048,982

UNITED STATES PATENT OFFICE 2,048,982

PUMPING MEANS

Adolf von Wangenheim, Detroit, Mich., assignor to Detroit Lubricator Company, Detroit, Mich., a corporation of Michigan

Original application February 18, 1931, Serial No. 516,764, now Patent No. 1,991,340. Divided and this application July 24, 1934, Serial No. 736,709

12 Claims. (Cl. 184—104)

My invention relates to new and useful improvements in pumping means, and more particularly to means for delivering fluid under pressure from a source of supply, and which is particularly adapted for feeding lubricant to working parts of an engine or other machine as is fully disclosed in my copending application Serial No. 516,764 filed February 18, 1931, now Patent No. 1,991,340, of which this application is a division.

An object of my invention is to provide a device which will deliver fluid such as oil or other lubricant from a source of supply at a desired pressure and rate.

Another object is to provide an efficient heating means for the oil supplied to the pumps.

Another object is to provide a heating means by which the main body of oil will be heated somewhat to maintain it at a proper viscosity and the oil adjacent the pump inlet will be maintained at a considerable higher temperature so that atmospheric changes of temperature will not change the rate of discharge from the pumps.

The invention consists in the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Figure 1:
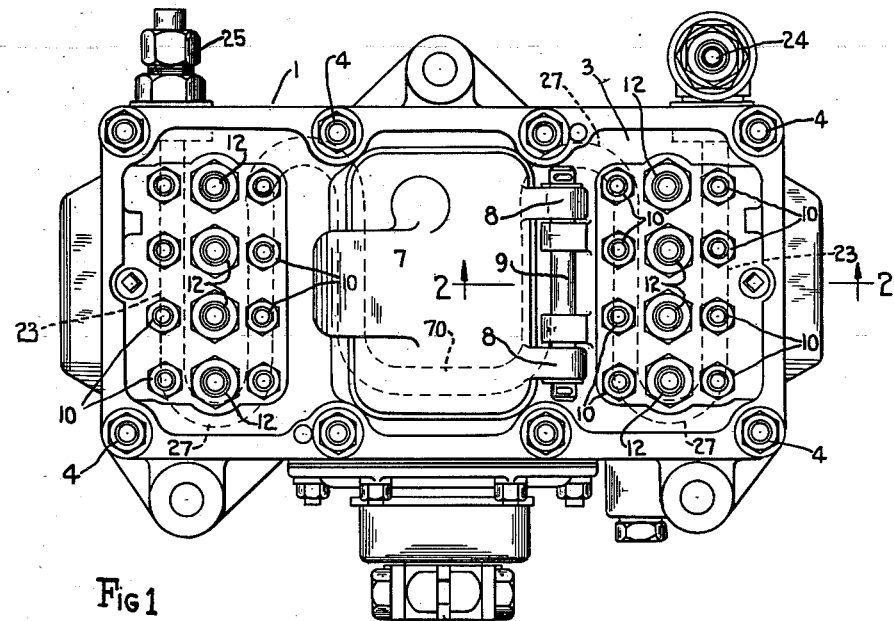
Figure 1 is a top plan view of a lubricator embodying my invention.
Figure 2:
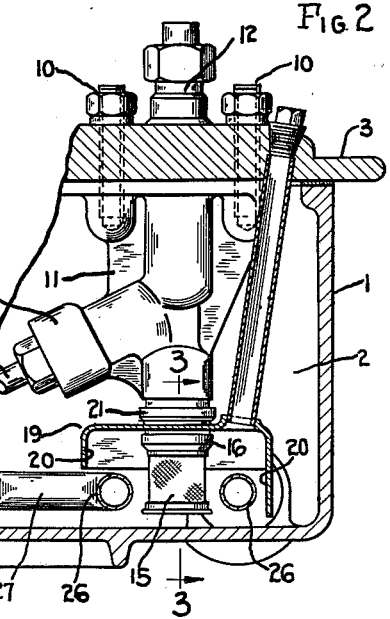
Fig. 2 is a view in section on the line 2—2 of Fig. 1.

Referring to the drawing by characters of reference, I designates generally a casing or container comprising a body or receptacle member 2 and a cover plate or closure member 3 secured thereto by studs and nuts 4, or the like. The casing I is preferably substantially rectangular, and journaled in bearings in the front and rear walls thereof is a main drive shaft which extends substantially horizontally across the interior of the casing and projects from the front wall, as at 5, and which serves to operate the pump driving mechanism which is fully and clearly shown and described in my said copending application. Through the closure member 3 at its mid-portion, is an aperture defining a filling opening which is closed by a cap or cover member 7 hinged as at 8 on a shaft 9.

Secured to the underface of the closure member 3, as by studs and nuts 10, are oppositely positioned parallel rows of pump casing or housings 11, each having an outlet or discharge nipple 12 projecting upward from the top face of closure member 3. The pump casings each includes a laterally, downward and inward inclined pump cylinder 13 which communicates with a vertical inlet and discharge passage 14 extending through casing 11. At the inlet end of passage 14 which opens substantially at the casing bottom wall, is a strainer element 15, preferably a cylindrical screen of fine wire mesh closed at its bottom end and carried by a nut 16. Within the passage 14 respectively below and above the communication of the pump cylinder therewith, are valve means 17, preferably downward seating ball checks. Within the cylinder 13 there is a pump plunger or piston 18 which projects therefrom at a downward inclination and which is reciprocated by the drive mechanism (not shown) driven by shaft 5.

Figure 3:
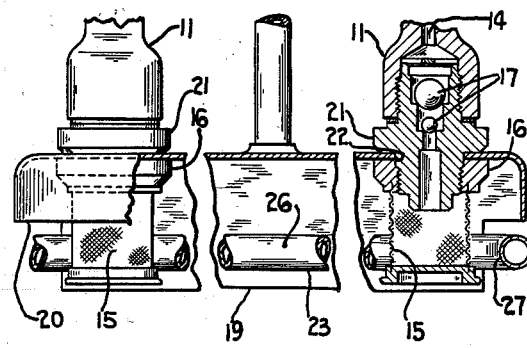
Fig. 3 is a detail view in section on the line 3—3 of Fig. 2.

Secured to and supported by the lower ends of the pump casings or members 11 there is a shield member 19 having a horizontal top portion and a depending continuous marginal flange or skirt 20 which terminates below the plane of the inlet to passage 14. The nuts 16 serve also to clamp the shield member to the pump inlet members 21, the shield member being apertured as at 22 (Fig. 3) to receive the members 21. Within the casing is a heating means 23 which is positioned beneath the shield member 19 and adjacent the pump passage inlet so that a quantity of heated fluid or lubricant will be maintained by the shield at the pump inlet for supply to passage 14. The means 23 preferably comprises a steam conduit or tube having an inlet 24 and an outlet 25 which open through the rear wall of the casing. The steam conduit 23 is of sinuous form lying in a plane adjacent and parallel to the bottom wall of the container 1. The conduit 23 has substantially parallel runs or portions 26 intermediate the bends or turns 27 thereof, such that adjacent runs or portions 26 beneath shield member 19 extend along opposite sides of the row of pump casing inlet screens 15.

The operation of the heating means is as follows: Steam or other heating fluid admitted at conduit inlet 24 will flow through the conduit 23 and from the outlet 25. The heat of the steam or fluid will be imparted by the runs 26 and bends 27 to the oil in the chamber 2 and particularly to the oil adjacent the pump inlets within screens 15. The heated oil tends to rise but will be caught by the shield members 19 and be maintained or trapped at the pump inlets so that the viscosity of the oil entering the pump passage 14 will be held substantially constant. It will also be noted that the temperature of the oil beneath the shield members 19 will be maintained at a higher temperature than the remaining body of oil in chamber 2 due to the trapping of the oil by the shields thereby increasing the efficiency of the heating means as radiating surface of the high temperature oil is reduced to a minimum.

What I claim and desire to secure by Letters Patent of the United States is:

1. A force feed lubricator, comprising a receptacle, a pump having an inlet positioned in said receptacle, means adjacent said inlet to heat lubricant in said receptacle, and a shield member positioned adjacent said inlet and having an open side disposed toward and overlying said heating means in close proximity thereto, said member cooperating with said heating means to maintain a quantity of heated lubricant at said inlet for supply to said pump.

2. A force feed lubricator, comprising a receptacle, a pump having an inlet positioned in said receptacle, a conduit extending through said receptacle adjacent said inlet for passage of heating medium to heat the lubricant in said receptacle, and a shield member overlying said conduit and carried by said pump adjacent said inlet, said member having a substantially continuous depending side wall surrounding said pump inlet to provide a receptacle for trapping oil heated by said heating medium therebeneath for supply to said pump.

3. A lubricating device, comprising a receptacle, lubricant discharge means for supplying lubricant from said receptacle to a part to be lubricated, said discharge means having inlet means from said receptacle, means to heat the lubricant in said receptacle, and a shield member cooperable with said inlet means depending therefrom and overlying said heating means, said shield member serving to maintain a quantity of heated lubricant at said inlet means for supply to said discharge means.

4. A lubricating device, comprising a receptacle, lubricant discharge means for supplying lubricant from said receptacle to a part to be lubricated, said discharge means having inlet means from said receptacle, means to heat the lubricant in said receptacle, and a shield member carried by said inlet means and overlying said heating means, said shield member having a depending peripheral flange serving to maintain a quantity of heated lubricant at said inlet means for supply to said discharge means.

5. A force feed lubricator, comprising a receptacle, a pump having its inlet positioned in said receptacle, a heating medium conveying tube positioned in said receptacle and having a portion disposed adjacent said inlet and substantially surrounding the same, and a shield member having a continuous flange extending below and surrounding said inlet, said shield member overlying said tube whereby to trap heated lubricant at said pump inlet.

6. A force feed lubricator, comprising a receptacle, a pump having an inlet member positioned in said receptacle, a continuous tube through which a heating medium circulates, said tube being positioned in said receptacle and having a portion disposed adjacent said inlet member, a shield member having a continuous flange extending below and surrounding said inlet member and having its lower end in spaced relation to the bottom wall of said receptacle, and means securing said shield member to said inlet member, said shield member overlying said portion of said tube whereby to trap heated lubricant at the inlet to said pump.

7. A force feed lubricator, comprising a receptacle, a pump having an inlet member positioned in said receptacle, means adjacent said inlet member to heat lubricant in said receptacle, a shield member providing a lubricant trapping chamber having an open side disposed toward said heating means in close proximity thereto, said shield member having an aperture in its top wall receiving said inlet member, and means clamping said shield member to said inlet member, said shield member overlying said heating means and cooperating with said heating means to maintain a quantity of heated lubricant at the inlet to said pump.

8. A force feed lubricator, comprising a receptacle, a pump having an inlet member positioned in said receptacle, means adjacent said inlet member to heat lubricant in said receptacle, a shield member providing a lubricant trapping chamber, said shield member having an aperture in its top wall receiving said inlet member, a screen member surrounding the inlet to said pump, and means supporting said screen member and shield member, said supporting means clamping said shield member to said inlet member, said shield member overlying said heating means and cooperating with said heating means to maintain a quantity of heated lubricant at the inlet to said pump.

9. A force feed lubricator, comprising a receptacle, a pump having an inlet member positioned in said receptacle, means adjacent said inlet member to heat lubricant in said receptacle, a shield member providing a lubricant trapping chamber and carried by said pump, a screen member for the inlet to said pump and carried thereby, and means attaching said shield member and said screen member to the pump, said shield member overlying said heating means and cooperating therewith to maintain a quantity of heated lubricant at the inlet to the pump.

10. A force feed lubricator, comprising a receptacle for lubricant, a pump having an inlet positioned in said receptacle, means adjacent said inlet to heat lubricant in said receptacle, and a removable shield member surrounding the inlet of said pump and having an open side disposed toward and in close proximity to said heating means, said shield member overlying said heating means to trap and maintain a quantity of heated oil at the inlet to the pump.

11. A force feed lubricator, comprising a receptacle for lubricant, a plurality of pumps having inlets positioned in said receptacle, conduit means for conveying a heating medium and disposed within said receptacle adjacent the bottom wall thereof, said heating means substantially surrounding each of said pump inlets in good heat transfer relation with the lubricant in the immediate vicinity of said inlet, and a shield member enclosing the ends of certain of said pump inlets and having an open side extending toward and overlying portions of said conduit heating means in close proximity thereto to trap the heated oil and maintain the same at the pump inlets.

12. A force feed lubricator, comprising a receptacle for lubricant, a plurality of pumps having inlets positioned in said receptacle, a sinuous heating conduit disposed within and adjacent the bottom of said receptacle, said pump inlets being disposed in a vertical plane within the loops of said sinous conduit whereby the lubricant surrounding the inlets to said pumps is in good heat transfer relation with said conduit, and a shield enclosing the inlet end of certain of said pumps and also portions of said heating conduit to maintain a quantity of heated lubricant at the inlets for supply to the pumps.

ADOLF von WANGENHEIM.